Mar. 27, 1923.
1,450,160
E. J. DU BOIS ET AL
PISTON RING
Filed May 14, 1920
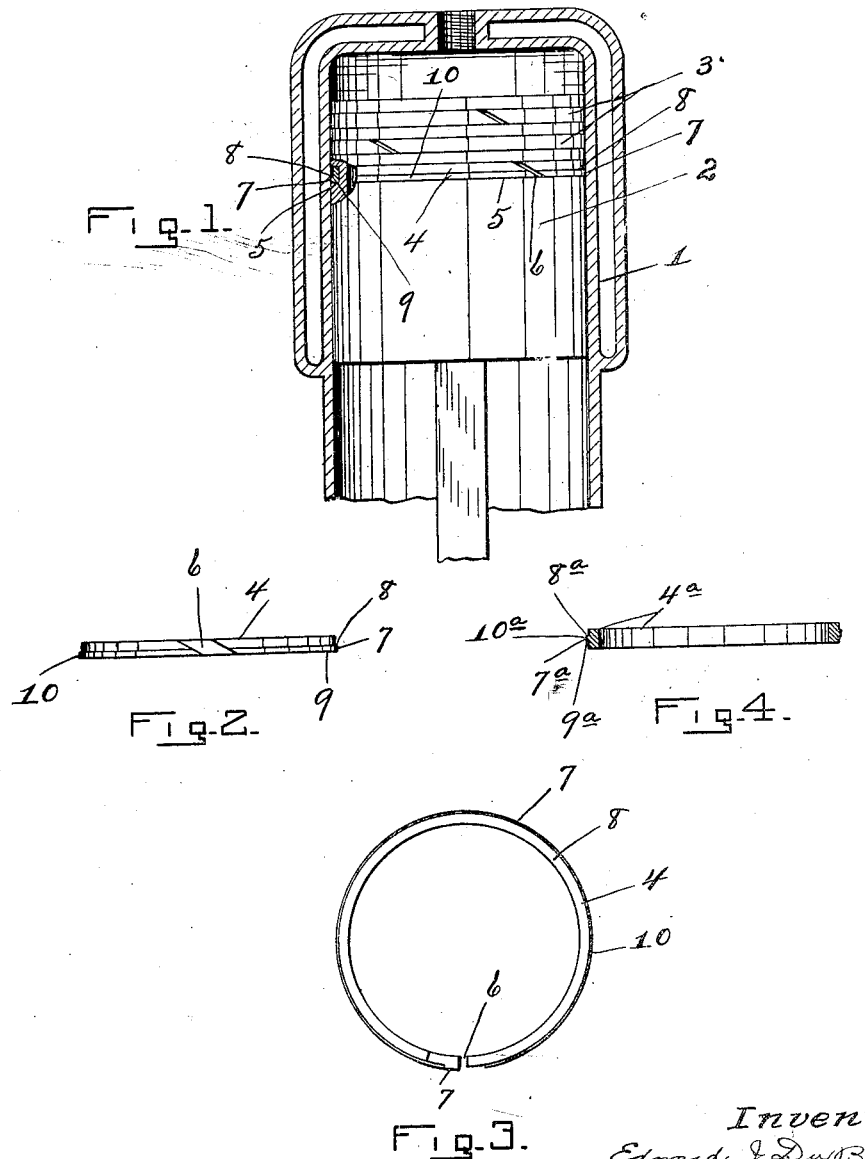

Patented Mar. 27, 1923.

1,450,160

UNITED STATES PATENT OFFICE.

EDWARD J. DU BOIS AND GEORGE C. DU BOIS, OF ALBANY, NEW YORK.

PISTON RING.

Application filed May 14, 1920. Serial No. 381,252.

*To all whom it may concern:*

Be it known that we, EDWARD J. DU BOIS and GEORGE C. DU BOIS, citizens of the United States of America, residing at Albany, county of Albany, and State of New York, have invented new and useful Improvements in Piston Rings, of which the following is a specification.

Reference may be had to the accompanying drawings, and the reference characters marked thereon, which form a part of this specification. Similar characters refer to similar parts in the several figures therein.

This invention relates to packing-rings for pistons of various kinds, and is particularly adapted for the piston-packing rings of internal-combustion engines.

Certain objects of the invention are to prevent the transmission of an excess of oil to the combustion chamber of an internal-combustion engine, and to regulate and determine within reasonable limits the consumption of oil by the engine.

Other objects will appear in connection with the following description.

In order to obtain the required elasticity and expansive force in a piston ring, it is necessary to make the ring of substantial height as well as of substantial cross-section. Piston rings as commonly made therefore present to the cylinder wall a large peripheral area which area extends throughout the height of the ring.

The expansive force of the ring being thus distributed over a large area, it is not sufficient at any point in rings of ordinary expansive force to scrape or remove from the cylinder walls the entire surplus of oil beyond that actually necessary for the proper lubrication of the piston.

It will be readily understood that if the area presented by the piston ring to the wall be reduced without a corresponding reduction in the expansive force of the ring, the limited ring-area presented to the cylinder wall will be forced more closely against said wall and will more effectually remove the surplus oil therefrom.

For this reason it has been proposed to employ a piston-ring having its outer peripheral surface concaved in cross section to present V-shaped knife-edges forming outer peripheral flanges around the top and the bottom edges of the ring.

Rings formed with such knife-edge flanges, while to a large extent overcoming the objections found in the ordinary ring, are not uniform in their operation because the V-shaped knife-edge soon wears flat vertically, and as this flattening of the knife-edge gradually increases due to wear, the surplus of oil left upon the cylinder wall will gradually increase; so that a ring constructed in this manner, if adapted when new to leave only the necessary amount of oil upon the cylinder wall, would after a short period of use leave an objectionable surplus of oil thereon.

In carrying out our invention we contemplate making the ring of sufficient height and cross-section to provide the proper elasticity and expansive force, while forming the ring with a definite external peripheral area for presentation to the cylinder wall, which area is so limited as to leave only the desired quantity of oil upon the cylinder wall, the ring being so formed that said area presented to the cylinder wall is not increased by wear but remains uniform throughout the life of the ring.

Fig. 1 of the drawings is a central vertical section of a broken-away portion of a cylinder of an internal-combustion engine fitted with a piston provided with a piston-ring embodying our invention.

Fig. 2 is a view in side elevation of the ring detached.

Fig. 3 is a top plan view of the same.

Fig. 4 is a view in cross section of a ring of different cross-section embodying our invention.

Referring to Figs. 1, 2 and 3, wherein our invention is shown in preferred form, 1 is the cylinder of an internal-combustion engine, and 2 is a piston adapted to work within said cylinder.

The piston is provided near its upper end with compression packing-rings, 3, which may be of any known form.

At a point below the packing-rings, 3, the piston is provided with a packing-ring, 4, embodying our invention.

The packing-ring, 4, is seated in a circumferential groove, 5, in the piston, and is split or divided at 6, permitting the ring to be expanded in applying it to, and removing it from, the piston.

The ring, 4, comprises a substantially cylindrical body formed with an external flange, 7, extending circumferentially around the lower edge of the ring as shown.

The upper surface, 8, and the lower surface, 9, of the flange, 7, are parallel with each other, while the outer peripheral surface, 10, of said flange, which is presented to the cylinder wall, is cylindrical.

The vertical extent of the cylindrical surface, 10, on the flange, 7, is determined in accordance with the expansive force of the ring and the quantity of oil which it is desired to leave as a film upon the cylinder wall; and the less oil it is desired to leave upon the cylinder wall, the less will be the height of said surface, 10, other conditions being the same.

The unflanged portions of the ring are of substantially less diameter than the bore of the cylinder so that the ring is held under compression solely by engagement of the cylinder wall with the peripheral surface, 10, on the flange, 7, in the operation of the ring.

The peripheral flange 7 is formed by a shallow peripheral recess so that the reduction in the bearing surface of the oil controlling piston ring is effected without a corresponding or material reduction in the resiliency or expansive strength of the ring and as the bearing surface of the peripheral flange decreases, the ratio of the expansive pressure of the ring to the area of the bearing surface of the flange increases. Thus, the feeding of the oil to the engine varies with the area of the bearing surface of the flange of the piston ring and it has been found by experience that with an ordinary piston ring giving a mileage of fifty to seventy-five miles for a given quantity of oil, that the mileage is increased to approximately two hundred and fifty to three hundred miles for the same quantity of oil by reducing the area of the bearing surface of the flange of the piston ring to less than one-half of that of the ring. The area of the bearing surface of the flange of the piston ring may, of course, be varied from this amount to increase or decrease the feed of the oil to the engine and it will be apparent that by means of the reduced bearing surface of the lubricant controlling piston ring the proper amount of oil may be fed to an engine and the excess oil may be prevented from being transmitted to the combustion chamber of the cylinder and carbon deposits resulting from the feed of excess oil to the combustion chamber and the bad effects thereof are prevented. Also, there is a great saving of oil and the consumption of oil reduced to one-third more or less of the amount ordinarily consumed. Also by providing the peripheral flange of the form shown and described with the parallel upper and lower sides and the cylindrical bearing surface, that the area of the latter will remain constant and will not vary, incident to wear. In other words, all wear on the flange is uniform.

The single cylindrical cylinder contacting surface is of substantially less width than the axial width of the ring and the remaining peripheral surface is depressed only sufficiently to provide cylinder clearance throughout the normal life of the ring. By making the upper surface, 8, and lower surface, 9, of the flange, 7, parallel with each other the vertical extent of the cylindrical surface, 10, is not affected by wear, but remains constant throughout the life of the ring.

For certain purposes of the invention it is immaterial at what point the flange projects from the body of the ring. Thus in Fig. 4, we have shown a ring, $4^a$, having the external peripheral flange, $7^a$, located about midway between the top and bottom edges of the ring, said flange having its upper surface, $8^a$, parallel with its lower surface, $9^a$, and having the cylindrical surface, $10^a$, for presentation to the wall of the cylinder.

We have shown our improved packing-ring applied to the lowermost groove only in the piston in which position it is most effective in regulating the supply of oil to the engine. It will be understood however, that rings embodying our invention may be used in place of any of the rings, 3.

It will also be understood that rings embodying our invention are adapted for use with pistons working in cylinders of various kinds such as pumps, air-compressors and the like.

What we claim as new and desire to secure by Letters Patent is—

1. The combination with a cylinder, and a piston provided with piston ring grooves, of one or more compression rings arranged in the said grooves, and a lubricant controlling piston ring located below the compression ring or rings and comprising an integral, substantially cylindrical body formed with an external, circumferential flange having parallel upper and lower sides and a cylindrical outer peripheral bearing surface of an area of less than one-half of that of the ring, the unflanged portion of the ring forming with the flange an exceedingly shallow peripheral recess having a vertical cylindrical wall at right angles to sides of the flange, the area of the bearing surface of the said flange controlling the feed of the lubricant and regulating the consumption of the same.

2. A lubricant controlling piston ring comprising a substantially cylindrical body provided with a circumferential flange having parallel upper and lower sides and a cylindrical outer peripheral bearing surface of less than one half of the width of the ring, said flange being formed by a shallow peripheral recess reducing the area of the bearing surface of the ring without a corresponding reduction in the expansive strength of the ring, whereby the ratio of the expansive pressure of the ring to the peripheral bearing surface and the pressure of the said surface against the cylinder is increased with the decrease of the said peripheral bearing surface.

3. An oil control ring for internal combustion engines, having a single cylindrical cylinder contacting surface of substantially less width than the axial width of the ring, the remaining peripheral surface being depressed only sufficiently to provide cylinder clearance throughout the normal life of the ring, whereby substantial reduction in the bearing area of the ring is effected without substantial reduction in tension.

In testimony whereof, we have hereunto set our hands this 10th day of May, 1920.

EDWARD J. DU BOIS.
GEORGE O. DU BOIS.